(12) United States Patent
Lindoff et al.

(10) Patent No.: US 10,070,376 B2
(45) Date of Patent: Sep. 4, 2018

(54) CARRIER FREQUENCY HANDLING IN CLUSTERS

(71) Applicant: Telefonaktiebolaget LM Ericsson (publ), Stockholm (SE)

(72) Inventors: Bengt Lindoff, Bjarred (SE); Johan Nilsson, Hollviken (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 57 days.

(21) Appl. No.: 14/917,055

(22) PCT Filed: Sep. 18, 2013

(86) PCT No.: PCT/EP2013/069338
§ 371 (c)(1),
(2) Date: Mar. 7, 2016

(87) PCT Pub. No.: WO2015/039681
PCT Pub. Date: Mar. 26, 2015

(65) Prior Publication Data
US 2016/0205617 A1    Jul. 14, 2016

(51) Int. Cl.
*H04W 4/00*      (2018.01)
*H04W 48/16*     (2009.01)
*H04W 24/08*     (2009.01)
*H04W 56/00*     (2009.01)

(52) U.S. Cl.
CPC .......... *H04W 48/16* (2013.01); *H04W 24/08* (2013.01); *H04W 56/0015* (2013.01); *H04W 56/0035* (2013.01)

(58) Field of Classification Search
USPC .......... 455/434, 517, 450; 370/336; 375/260
See application file for complete search history.

(56) References Cited

U.S. PATENT DOCUMENTS 9,629,050 B2 * 4/2017 Siomina ................ H04W 36/18
2009/0034589 A1  2/2009 Hahm et al.
(Continued)

FOREIGN PATENT DOCUMENTS

GB       2425233 A       10/2006
WO    2008035140 A1      3/2008
(Continued)

OTHER PUBLICATIONS

Non-Final Office Action dated Sep. 20, 2017 in connection with U.S. Appl. No. 14/915,244, 15 pages.
(Continued)

*Primary Examiner* — David Q Nguyen
(74) *Attorney, Agent, or Firm* — Leffler Intellectual Property Law, PLLC

(57) ABSTRACT

There is provided mechanisms for carrier frequency handling in a cluster based communications network. According to one aspect there is provided a method performed by a wireless device camping on or served by a cluster head device associated with a cluster head carrier frequency. According to one aspect there is provided a method performed by a cluster head device associated with a cluster head carrier frequency. A corresponding wireless device, a corresponding cluster head device, and corresponding computer programs and computer program products are also provided.

7 Claims, 4 Drawing Sheets

(56) References Cited

U.S. PATENT DOCUMENTS

| | | |
|---|---|---|
| 2010/0029295 A1 | 2/2010 | Touboul et al. |
| 2010/0067507 A1 | 3/2010 | Park |
| 2011/0275402 A1 | 11/2011 | Charipadi et al. |
| 2011/0281571 A1 | 11/2011 | Patel et al. |
| 2011/0281574 A1 | 11/2011 | Patel et al. |
| 2012/0094652 A1 | 4/2012 | Kilgour |
| 2012/0231790 A1 | 9/2012 | Lindoff et al. |
| 2012/0294245 A1 | 11/2012 | Chang et al. |
| 2013/0122917 A1 | 5/2013 | Yavuz et al. |
| 2013/0172036 A1* | 7/2013 | Miklos .............. H04W 8/005 455/517 |
| 2013/0281080 A1 | 10/2013 | Carmon |
| 2014/0105192 A1* | 4/2014 | Park .............. H04W 56/00 370/336 |
| 2015/0131749 A1* | 5/2015 | Siomina .............. H04J 11/005 375/260 |
| 2016/0081039 A1* | 3/2016 | Lindoff .............. H04W 52/383 455/450 |

FOREIGN PATENT DOCUMENTS

| | | |
|---|---|---|
| WO | 2012082024 A1 | 6/2012 |
| WO | 2012087190 A1 | 6/2012 |
| WO | 2013005972 A1 | 1/2013 |
| WO | 2013036873 A2 | 3/2013 |
| WO | 2013100831 A1 | 7/2013 |

OTHER PUBLICATIONS

PCT International Search Report, dated May 26, 2014, in connection with International Application No. PCT/EP2013/069340, all pages.

PCT Written Opinion, dated May 26, 2014, in connection with International Application No. PCT/EP2013/069340, all pages.

Ericsson et al., Synchronization Procedures and Signals for D2D Discovery and Communication, 3GPP TSG-RAN WG1 #74, R1-132911, Barcelona, Spain, Aug. 19-23, 2013, 14 pages.

Nokia et al., D2D Discovery Signal Considerations, 3GPP TSG-RAN WG1 Meeting #74, R1-133498, Barcelona, Spain, Aug. 19-23, 2013, 6 pages.

Interdigital, D2D Communications, 3GPP TSG-RAN WG1 Meeting #74, R1-133178, Barcelona, Spain, Aug. 19-23, 2013, 8 pages.

Yanxiang Jiang et al., Research of Synchronization and Training Sequence Design for Cooperative D2D Communications Underlaying Hyper-Cellular Networks, 2013 IEEE International Conference on Communications Workshops, Jun. 9, 2013, pp. 271-275.

3GPP TSR-RAN1 Meeting #72, R1-120469, LTE device to device evaluation methodology, St. Julian's, Malta, Jan. 28-Feb. 1, 2013, 7 pages.

PCT International Search Report, dated Jul. 3, 2014, in connection with International Application No. PCT/EP2013/069338, all pages.

PCT Written Opinion, dated Jul. 3, 2014, in connection with International Application No. PCT/EP2013/069338, all pages.

Korean Office Action, dated Sep. 15, 2017, in connection with Korean Application No. 10-2016-7009778, 3 pages.

English language translation of Korean Office Action, dated Sep. 15, 2017, in connection with Korean Application No. 10-2016-7009778, 2 pages.

European Communication dated Oct. 25, 2017, in connection with EP Application No. 13762859.0, 4 pages.

Non-Final Office Action dated Apr. 18, 2018 in connection with U.S. Appl. No. 14/915,244, 16 pages.

\* cited by examiner

CARRIER FREQUENCY HANDLING IN CLUSTERS

TECHNICAL FIELD

Embodiments presented herein relate to cluster based communications networks, and particularly to methods, devices, a computer programs, and computer program products for carrier frequency handling in cluster based communications networks.

BACKGROUND

In mobile communication networks, there is always a challenge to obtain good performance and capacity for a given communications protocol, its parameters and the physical environment in which the mobile communication network is deployed.

In national security and public safety (NSPS) scenarios, there is a need to allow wireless devices (such as cellular user equipment, UE, modems, smartphones, sensors, tablet computer, machine type devices) to communicate directly with one another when they are under cellular network coverage. In 3GPP LTE networks (NW), this so called Device to Device communication (D2D) or Proximity Services (ProSe) is made possible by the "LTE Direct" technology that allows a cellular base station (BS or eNB) to set up a direct D2D link between two UEs and allocate resources for that link.

D2D communication exists in several versions today. Examples include Bluetooth, several variants of the IEEE 802.11 standards suite such as WiFi Direct, and Flashlinq. Recently, device-to-device communications as an underlay to cellular networks have been proposed as a means to take advantage of the proximity of communicating devices and at the same time to allow devices to operate in a controlled interference environment. An advantage with D2D under cellular a cellular NW control (network assisted D2D) is that optimized spectrum usage as well as low power discovery algorithms can be developed.

A technical mechanism that addresses D2D communication both in and outside NW coverage is based on clustering, where some of the devices (UEs) act as a Cluster Head (CH) device and other devices act as Slave devices. A CH device can be compared to a small range base station that, in the absence of a cellular eNB, provides (a subset of and) similar functionality as an eNB. For example, a CH device may provide synchronization and radio resource management within the cluster and may also act as a central node to create a tree topology for communication with the cluster. In addition, the CH device may also provide a relaying functionality towards other clusters or towards a cellular eNB.

In a cluster scenario, wireless devices within the cluster are required to do cell search on regular basis in order to be able to detect whether the wireless device has come into NW coverage again. Once a wireless device (or the CH device itself) determines presence of a regular network node, the cluster has an operative connection to the core network (and Internet Protocol network) and more services may be able to be supported within the cluster.

In general terms, CH devices are low power nodes, often battery driven, and assumed to have lower cost compared to eNBs (or other regular NW nodes). Therefore, the CH devices will be made up by simpler components with lower performance compared to that of an eNB. One such component is the crystal oscillator (XO), which is used for generating reference timing and reference carrier frequency. Current NW nodes have a very accurate XO and are assumed always to be connected to a power supply (such as a regular power supply, solar power, a powerful battery backup, etc.). The requirement for the frequency accuracy for a NW node is 0.1 ppm, corresponding to a frequency error of less than 200 Hz at a carrier frequency of 2 GHz.

In current wireless devices (mobile phones, tablets, etc.) the XO accuracy is 10-15 ppm implying a frequency error of ±20-30 kHz at 2 GHz. Hence, once a wireless device at start up connects to a NW node, the wireless today needs need to not only to find a NW node (a cell) to camp on but also to find the correct carrier frequency and lock its interval frequency generation to a more accurate source than the internal XO of the wireless device. Known Cell Search (CS) algorithms aim for determination of specific synchronization signals transmitted from the NW nodes in order to determine timing, the exact carrier frequency, as well as the NW node cell ID. Synchronization signals (PSS/SSS in LTE, P-SCH/S-SCH in WCDMA) used for determining cells in current cellular systems like LTE and WCDMA/HSPA work with a frequency error of up to approximately 3-4 kHz. With this robustness of CS, a wireless device can perform CS using its own carrier frequency in connected mode (i.e. when in-sync with the NW), also for the highest reasonable Doppler shift. However, during initial CS, i.e. when a wireless device has not yet connected to any NW node, a frequency grid for the CS is needed with a 5-10 kHz carrier spacing in order to cope with the uncertainty of the XO.

CH devices may have XOs with accuracies closer to today's UEs than today's NW nodes, mainly due to cost and power consumption reasons. This means that the devices in the network need to operate with regular network nodes (such as eNBs) and low power network nodes (such as CH devices) that have different XO accuracy.

Hence, there is still a need for an improved carrier frequency handling in heterogeneous communications networks, such as cluster based communications networks.

SUMMARY

An object of embodiments herein is to provide improved carrier frequency handling in heterogeneous communications networks, such as cluster based communications networks.

CH devices in out-of-network coverage scenarios act as a synchronization reference with respect to timing and carrier frequency within the cluster. That means that wireless devices in the cluster adjust their internal clocks (XO) to the clock of the CH device. However, since the CH clock reference may be rather inaccurate compared to the true reference (as provided by NW nodes), wireless devices operatively connected to the CH devices may experience significant frequency error (larger than 3-4 kHz) when detecting a regular network node. The inventors of the enclosed embodiments have through a combination of practical experimentation and theoretical derivation therefore realized that when the wireless device receives information from the CH device, the received information may interfere with information transmitted within the network node coverage area. Even if the CH device is assumed to use frequency resources which are orthogonal to the frequency resources of the network node, adjacent sub-carriers (some transmitted from the CH device and some from the network node) will, due to the large frequency offset, collide and interfere with each other. This may harm the capacity in the communications network and make it difficult for the wireless device to act as a relay between the network node and the CH device (e.g., for improved service support within the cluster).

An object of embodiments herein is to provide improved carrier frequency handling in heterogeneous communications networks, such as cluster based communications networks, by addressing frequency differences between network nodes and CH devices once at least one wireless device in a cluster outside network coverage enters into network coverage again.

According to a first aspect there is presented a method for carrier frequency handling in a cluster based communications network. The method is performed by a wireless device. The wireless device is camping on or served by a cluster head device associated with a cluster head carrier frequency $f_{CH}$. The method comprises detecting a network node. The network node is associated with a network node carrier frequency $f_{NN}$. The method comprises, in a case the cluster head carrier frequency differs more than a predetermined threshold $\Delta$ from the network node carrier frequency, reporting an event relating thereto to the cluster head device.

According to a second aspect there is presented a method for carrier frequency handling in a cluster based communications network. The method is performed by a cluster head device. The cluster head device is associated with a cluster head carrier frequency $f_{CH}$. The method comprises acquiring a difference between the cluster head carrier frequency and a network node carrier frequency $f_{NN}$ associated with a network node. The method comprises determining, for a wireless device camping on or served by the cluster head device, a frequency adjustment action out of at least two possible frequency adjustment actions based on the magnitude of the frequency difference.

Advantageously the methods of the first and second aspects resolve, or at least mitigate issues relating to large frequency difference between network nodes and CH devices once at least one wireless device in a cluster outside network coverage enters into network coverage again. This may result in less interference in the communications network as well as ease of relaying information form the network node to the cluster.

According to a third aspect there is presented a wireless device for carrier frequency handling in a cluster based communications network. The wireless device is arranged for camping on or being or served by a cluster head device. The cluster head device is associated with a cluster head carrier frequency $f_{CH}$. The wireless device comprises a processing unit. The processing unit is arranged to detect a network node. The network node is associated with a network node carrier frequency $f_{NN}$. The processing unit is arranged to, in a case the cluster head carrier frequency differs more than a predetermined threshold $\Delta$ from the network node carrier frequency, report an event relating thereto to the cluster head device.

According to a fourth aspect there is presented a cluster head device for carrier frequency handling in a cluster based communications network. The cluster head device is associated with a cluster head carrier frequency $f_{CH}$. The cluster head device comprises a processing unit. The processing unit is arranged to acquire a difference between the cluster head carrier frequency and a network node carrier frequency $f_{NN}$ associated with a network node. The processing unit is arranged to determine, for a wireless device camping on or served by the cluster head device, a frequency adjustment action out of at least two possible frequency adjustment actions based on the magnitude of the frequency difference.

According to a fifth aspect there is presented a computer program for carrier frequency handling in a cluster based communications network, the computer program comprising computer program code which, when run on a wireless device, causes the wireless device to perform a method according to the first aspect.

According to a sixth aspect there is presented a computer program for carrier frequency handling in a cluster based communications network, the computer program comprising computer program code which, when run on a cluster head device, causes the cluster head device to perform a method according to the second aspect.

According to a seventh aspect there is presented a computer program product comprising a computer program according to at least one of the fifth and sixth aspect, respectively, and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any feature or step indicated by dashed lines should be regarded as optional.

Figure 1:
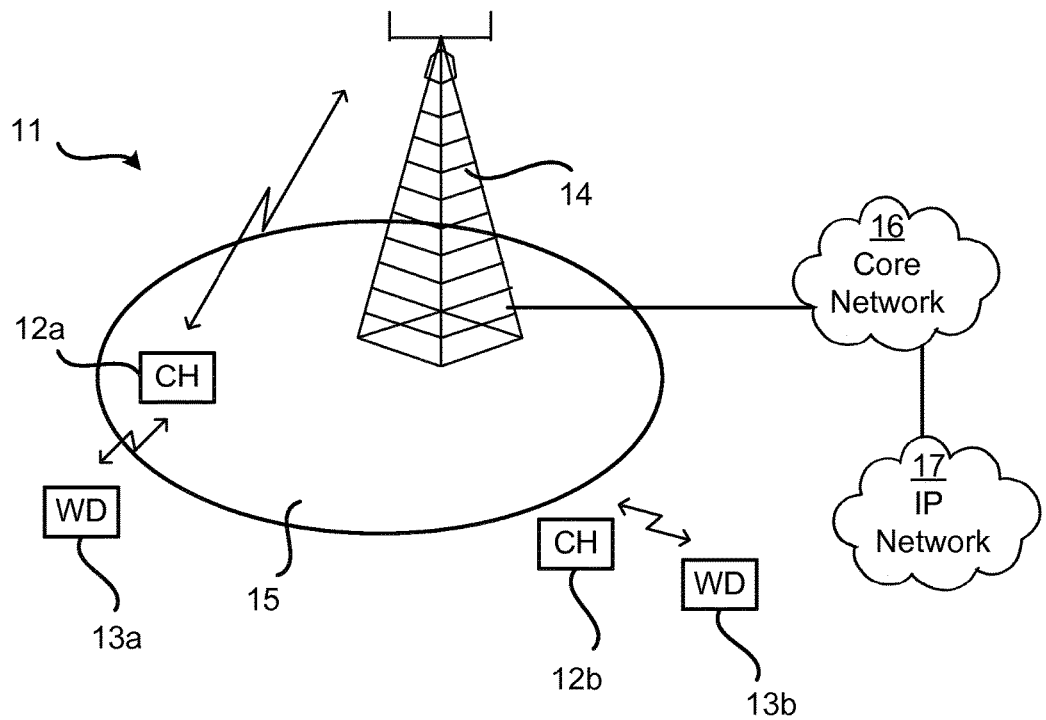
FIG. 1 is a schematic diagram illustrating a cellular communication network according to embodiments.

FIG. 1 shows a schematic overview of an exemplifying cellular communication network 11. The cellular communication network 11 comprises a network node (NN) 14 providing network coverage over a cell 15. A cell 15 is served by at least one of network node 14. A wireless device (WD) positioned in a particular cell is thus provided network service by the network node 14 serving that particular cell 15. Further, the network node 14 is arranged to communicate with other network nodes (not shown) via communications links. The network node 14 is also operatively connected to a core network 16. The core network 16 may provide services and data to the WD operatively connected to at least one network node 14 from an external packet switched Internet Protocol (IP) data network 17. The cellular communications network 11 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable.

One situation that could arise is that one or more of the WDs (such as WDs 13a, 13b) are outside the coverage area 15 of the network node 14, or that there is a failure of the network node 14 or that the maximum cell load limit of a network node 14 is reached. In order for a WD 13a, 13b not able to establish a direct communications link to a network node 14 to access services and data of the IP data network 17, or for a WD 13a, 13b to engage in local communications with UEs that are in its proximity (for this or any other purpose), clustering mechanisms may be deployed in the communications network 1a. By means of the clustering mechanisms an ad hoc network may thus be formed. Such mixed cellular and ad hoc networks provide a natural solution to providing communication services with partial infrastructure coverage or even in geographical areas without any cellular network coverage due to lack of infrastructure or due to natural disaster, public safety or failure situations. The cellular communication network 11 therefore further comprises cluster head (CH) devices 12a, 12b. The CH devices 12a, 12b may be regarded as low power nodes. Physically, the CH devices 12a, 12b may be of the same type as the WDs 13a, 13b. The CH devices 12a, 12b are arranged to serve as low power network nodes. The term CH device is thus used herein to distinguish the role a device, such as a UE, takes in a cluster context. The CH devices 12a, 12b may in other aspects be identical to the wireless devices 13a, 13b. As the skilled person understands, the cellular communications network 11 may comprise a plurality of network nodes 14 and a plurality of WDs 13a, 13b and CH devices 12a, 12b operatively connected to at least one of the plurality of network nodes 14.

In the cellular communication network 11 it is assumed that the network node 14 is power supplied (regular power supply, solar power, battery backup etc.) and is using high cost components. Hence its crystal oscillator (XO) is assumed to be very accurate and the network node 14 therefore also assumed to transmit with a correct carrier frequency, $f_c=f_o$. Two different clusters are shown in FIG. 1; a first cluster comprises wireless device 13a operatively connected to cluster head device 12a, and a second cluster comprises wireless device 13b operatively connected to cluster head device 12b.

For the first cluster the cluster head device 12b is within the coverage of the network node 14 (as defined by the cell 15). In this case, the network node 14 serves as the reference clock (and as the carrier frequency reference), and the cluster head device 12a serving the wireless device 13a outside of the network coverage may thus be in synchronization with the network node 14 via the cluster head device 12a. The wireless device 13a is therefore assumed to transmit on the correct carrier frequency $f_o$.

For the second cluster, both the wireless device 13b and the cluster head device 12b are outside the coverage of the network node 14 (as defined by the cell 15). In this case the cluster head device 12b serves as the clock reference. However, due to an inaccurate XO in the cluster head device 12b (as compared to the XO of the network node 14) there may be a large frequency error in the carrier frequency, i.e. $f_c=f_o+\Delta$. In this case, the wireless devices served by the cluster head device 12b may, as will be further disclosed with references to the enclosed embodiments, configured with information about possible frequency error, due to the inaccurate clock in the cluster head device 12b. As will be further disclosed with references to the enclosed embodiments, once a wireless device (or the CH device itself) determines presence of a network node 14 from performing a cell search, it determines the carrier frequency of the network node 14 relative the carrier frequency of the CH device. If the difference is larger than a predetermined value (hereinafter denoted $\Delta$) a "frequency event" is reported to the CH device. The CH receives the information and updates its carrier frequency, and may also in some embodiments inform wireless devices operatively connected to the CH device.

The embodiments disclosed herein thus relate to carrier frequency handling in a cluster based communications network 11. In order to facilitate carrier frequency handling in a cluster based communications network 11 there is provided a wireless device 13a, 13b a method performed by the wireless device 13a, 13b, a computer program comprising code, for example in the form of a computer program product, that when run on a wireless device 13a, 13b, causes the wireless device 13a, 13b to perform the method. In order to facilitate carrier frequency handling in a cluster based communications network 11 there is also provided a cluster head device 12a, 12b a method performed by the cluster head device 12a, 12b, a computer program comprising code, for example in the form of a computer program product, that when run on a cluster head device 12a, 12b, causes the cluster head device 12a, 12b to perform the method.

Figure 2A:
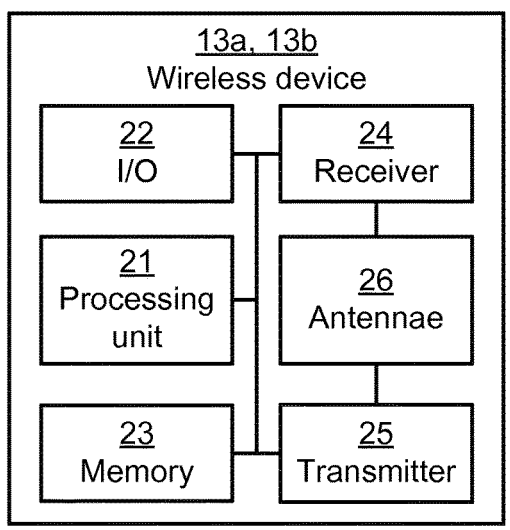
FIG. 2a is a schematic diagram showing functional modules of a wireless device according to an embodiment.

FIG. 2a schematically illustrates, in terms of a number of functional modules, the components of a wireless device 13a, 13b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a memory 23. Thus the processing unit 21 is thereby arranged to execute methods as herein disclosed. The memory 23 may also comprise persistent storage, which, for example, can be any single one or combination of magnetic memory, optical memory, solid state memory or even remotely mounted memory. The wireless device 13a, 13b may further comprise an input/output (I/O)

interface 22 for receiving and providing information to a user interface. The wireless device 13a, 13b also comprises one or more transmitters 25 and receivers 24, comprising analogue and digital components and a suitable number of antennae 26 for radio communication with a network node 14, a cluster head device 12a, 12b, or another wireless device 13b. The processing unit 21 controls the general operation of the wireless device 13a, 13b, e.g. by sending control signals to the transmitter 25 and/or receiver 24 and receiving reports from the transmitter 25 and/or receiver 24 of its operation. Other components, as well as the related functionality, of the wireless device 13a, 13b are omitted in order not to obscure the concepts presented herein.

Figure 2B:
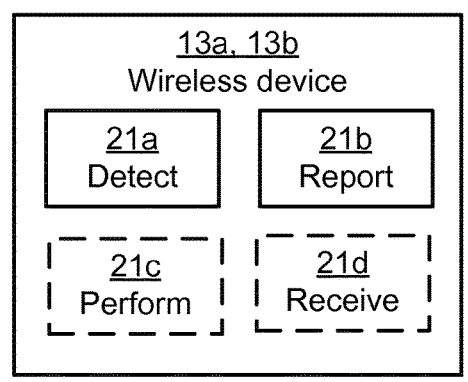
FIG. 2b is a schematic diagram showing functional units of a wireless device according to an embodiment.

FIG. 2b schematically illustrates, in terms of a number of functional units, the components of a wireless device 13a, 13b according to an embodiment. The wireless device 13a, 13b of FIG. 3 comprises a number of functional units; a detecting unit 21a and a reporting unit 21b. The wireless device 13a, 13b of FIG. 2b may further comprises a number of optional functional units, such as any of a performing unit 21c, and a receiving unit 21d. The functionality of each functional unit 21a-d will be further disclosed below in the context of which the functional units may be used. In general terms, each functional unit 21a-e may be implemented in hardware or in software. The processing unit 21 may thus be arranged to from the memory 23 fetch instructions as provided by a functional unit 21a-d and to execute these instructions, thereby performing any steps as will be disclosed hereinafter.

Figure 3A:
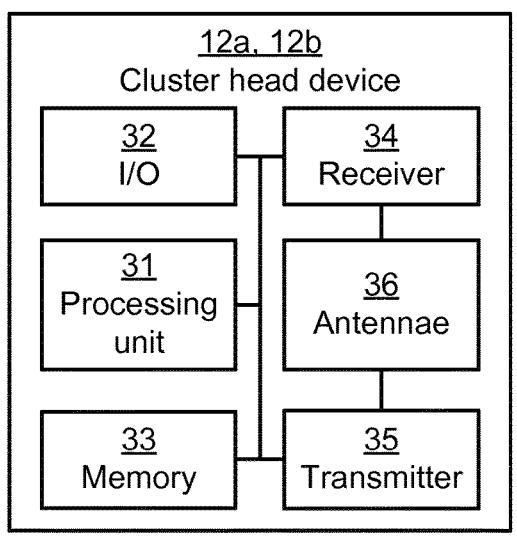
FIG. 3a is a schematic diagram showing functional modules of a cluster head device according to an embodiment.

FIG. 3a schematically illustrates, in terms of a number of functional modules, the components of a cluster head device 12a, 12b according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a memory 33. Thus the processing unit 31 is thereby arranged to execute methods as herein disclosed. The memory 33 may also comprise persistent storage, which, for example, can be any single one or combination of magnetic memory, optical memory, solid state memory or even remotely mounted memory. The cluster head device 12a, 12b may further comprise an input/output (I/O) interface 32 for receiving and providing information to a user interface. The cluster head device 12a, 12b also comprises one or more transmitters 35 and receivers 34, comprising analogue and digital components and a suitable number of antennae 36 for radio communication with a network node 14, a wireless device 12a, 12b, or another cluster head device 13b. The processing unit 31 controls the general operation of the cluster head device 13a, 13b, e.g. by sending control signals to the transmitter 35 and/or receiver 34 and receiving reports from the transmitter 35 and/or receiver 34 of its operation. Other components, as well as the related functionality, of the cluster head device 12a, 12b are omitted in order not to obscure the concepts presented herein.

Figure 3B:
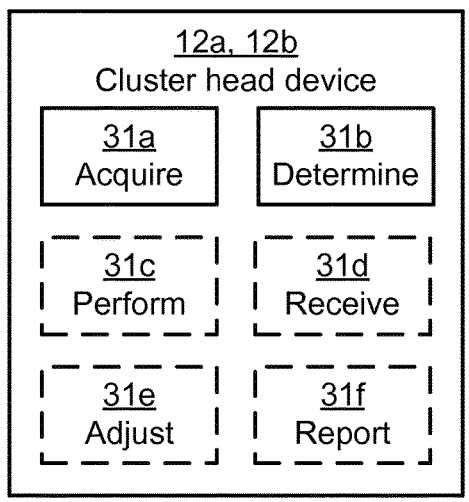
FIG. 3b is a schematic diagram showing functional units of a cluster head device according to an embodiment.

FIG. 3b schematically illustrates, in terms of a number of functional units, the components of a cluster head device 12a, 12b according to an embodiment. The cluster head device 12a, 12b of FIG. 3b comprises a number of functional units; an acquiring unit 31a and a determining unit 31b. The cluster head device 12a, 12b of FIG. 3b may further comprises a number of optional functional units, such as any of a performing unit 31c, a receiving unit 31d, an adjusting unit 31e, and a reporting unit 31f. The functionality of each functional unit 31a-f will be further disclosed below in the context of which the functional units may be used. In general terms, each functional unit 31a-b may be implemented in hardware or in software. The processing unit 31 may thus be arranged to from the memory 33 fetch instructions as provided by a functional unit 31a-f and to execute these instructions, thereby performing any steps as will be disclosed hereinafter.

Figure 4:
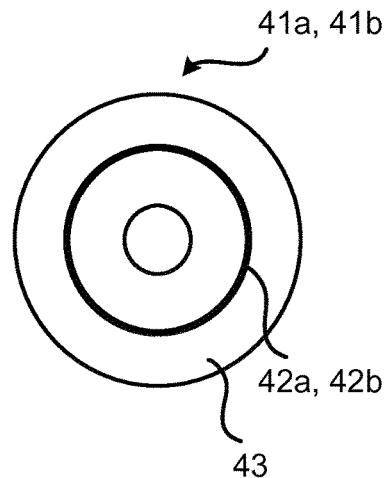
FIG. 4 shows one example of a computer program product comprising computer readable means according to an embodiment.
Figure 5:
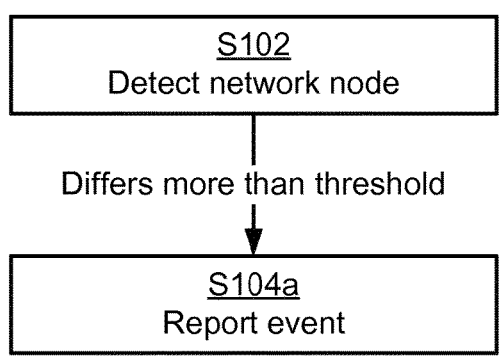
FIGS. 5, 6, 7, and 8 are flowcharts of methods according to embodiments.
Figure 6:
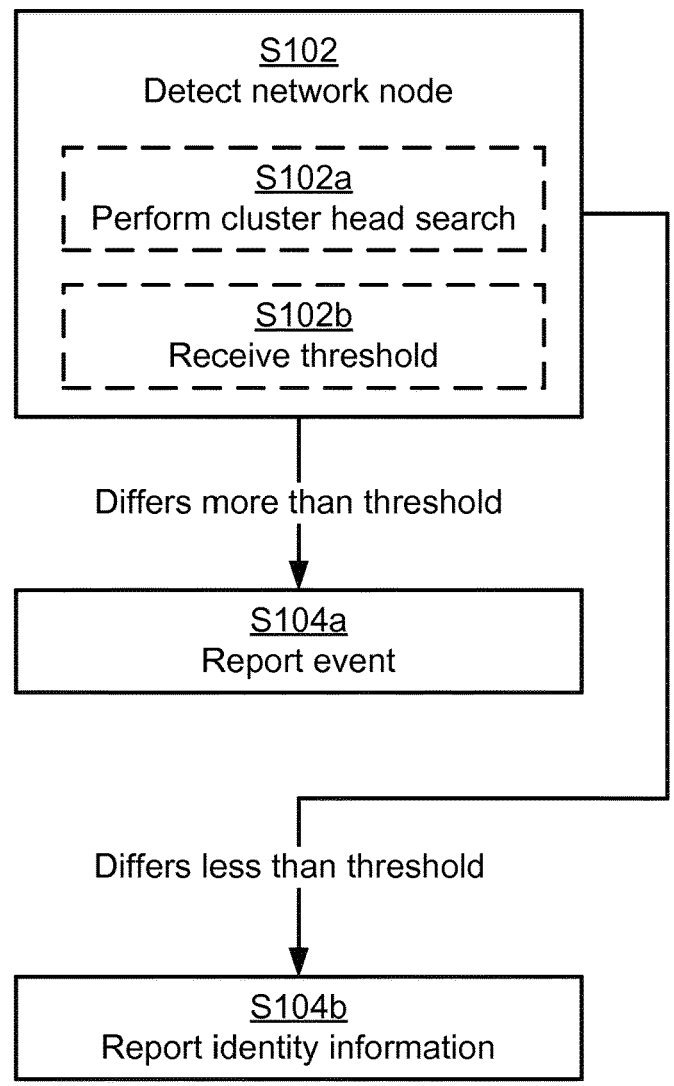
Figure 7:
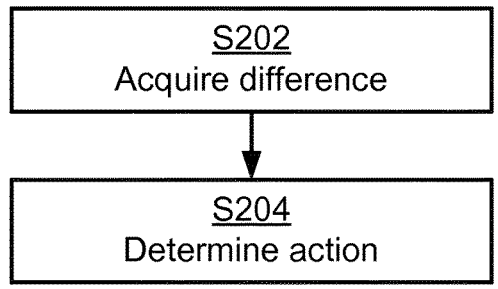
Figure 8:
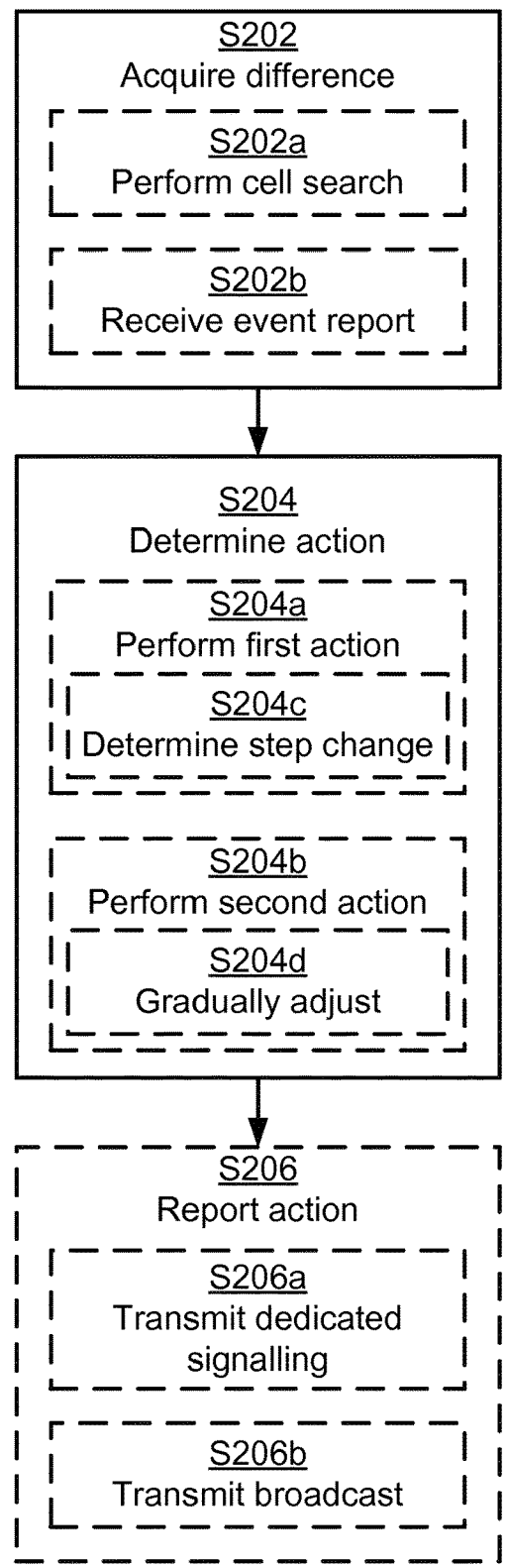

FIGS. 5 and 6 are flow charts illustrating embodiments of methods for carrier frequency handling in a cluster based communications network as performed by a wireless device 13a, 13b. FIGS. 7 and 8 are flow charts illustrating embodiments of methods for carrier frequency handling in a cluster based communications network as performed by a cluster head device 12a, 12b. The methods are advantageously provided as computer programs 42a, 42b. FIG. 4 shows one example of a computer program product 41a, 41b comprising computer readable means 43. On this computer readable means 43, at least one computer program 42a, 42b can be stored, which at least one computer program 42a, 42b can cause the processing units 21, 31 and thereto operatively coupled entities and devices, such as the memories 23, 33, the I/O interfaces 22, 32, the transmitters 25, 35, the receivers 24, 34 and/or the antennae 26, 36 to execute methods according to embodiments described herein. The computer program 42a, 42b and/or computer program product 41a, 42b may thus provide means for performing any steps as herein disclosed.

In the example of FIG. 4, the at least one computer program product 41a, 41b is illustrated as an optical disc, such as a CD (compact disc) or a DVD (digital versatile disc) or a Blu-Ray disc. The at least one computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 42a, 42b is here schematically shown as a track on the depicted optical disk, the at least one computer program 42a, 42b can be stored in any way which is suitable for the computer program product 41a, 41b.

First Overall Embodiment; Wireless Device

Reference is now made to FIG. 1 and FIG. 5. A method for carrier frequency handling in a cluster based communications network 11 as performed by a wireless device 13b camping on or served by a cluster head device 12b associated with a cluster head carrier frequency $f_{CH}$ will now be disclosed. An idle wireless device is camping on a cluster head device 12b (and hence is known by the cluster head device 12b, but has no active connection to the cluster head device 12b), whilst an active wireless device is served by a cluster head device (and thus has an active connection). Whether camping on or being served by a cluster head device, the wireless device receives a downlink (DL) carrier on a first reference carrier. The reference carrier frequency of the wireless device may coincide with the carrier frequency of the cluster head device, but may differ somewhat due to Doppler shift and/or remaining frequency error. Hence the status of the wireless device with respect to the cluster head device is in-sync.

In general terms, the wireless device 13b may receive measurement configuration message for the cluster head device 12b indicating principles for scanning for neighboring network nodes 14 and/or other cluster head devices 12a. As will be further disclosed below, the measurement configuration message may thus be either an intra-frequency measurement configuration message or an inter-frequency measurement configuration message. The wireless device 13b thus scans for network nodes until a network node 14 is detected. It is assumed that a network node 14 is detected. Hence, the processing unit 21 of the wireless device 13b is arranged to, in a step S102, detect a network node 14. The detecting may be performed by executing functionality of the detecting unit 21a. The computer program 42a and/or computer program product 41a may thus provide means for this determining. The network node 14 is associated with a network node carrier frequency $f_{NN}$.

If a NW node is detected the wireless device 13b determines the frequency difference between the network node 14 and the cluster head device 12b the wireless device 13b is operatively connected to. If the difference is larger than a predetermined threshold Δ, a frequency error event is sent to the cluster head device 12b. The processing unit 21 of the wireless device 13b is thus arranged to, in a step S104a, and in a case the cluster head carrier frequency differs more than a predetermined threshold Δ from the network node carrier frequency, report an event relating thereto to the cluster head device 12b. The reporting may be performed by executing functionality of the reporting unit 21b. The computer program 42a and/or computer program product 41a may thus provide means for this reporting.

Reference is now made to FIG. 1 and FIG. 6. Embodiments relating to further details of carrier frequency handling as performed by a wireless device 13b camping on or served by a cluster head device 12b associated with a cluster head carrier frequency $f_{CH}$ will now be disclosed.

According to an embodiment the event comprises information of the difference between the cluster head carrier frequency and the network node carrier frequency. The event may be reported in an event report. Also other information may be included in the event report. For example, the processing unit 21 of the wireless device 13b may be arranged to in the event report also include network node information (such as, but not limited to, cell ID, signal strength etc.).

Also in a case the difference is smaller than the predetermined threshold Δ say the wireless device 13b may transmit a report to the cluster head device 12b. For example, the wireless device 13b may report network node information (such as, but not limited to, cell ID, signal strength etc.) to the cluster head device 12b. According to an embodiment the processing unit 21 of the wireless device 13b is thus arranged to, in an optional step S104b, and in a case the difference is smaller than the predetermined threshold, report identity information of the network node to the cluster head device. The reporting may be performed by executing functionality of the reporting unit 21b. The computer program 42a and/or computer program product 41a may thus provide means for this reporting There may be different ways to detect the network node 14. According to an embodiment the processing unit 21 of the wireless device 13b is arranged to, in an optional step S102a, perform cell search so as to detect the network node 14. The cluster cell search may be performed by executing functionality of the performing unit 21c. The computer program 42a and/or computer program product 41a may thus provide means for this performing. This cell search may either be a regular cell search where the wireless device 13b searches for a regular network node 14 or a cluster cell search where the wireless device 13b searches for a further cluster head device 12a inside the current cluster of the wireless device 13b. Hence the network node 14 may be detected by performing cell search within the cluster to which the wireless device 13b belongs as well as regular cell search for a network node 14 outside the cluster to which the wireless device 13b belongs. In the inter-frequency case the wireless device 13b determines a network node carrier frequency on an inter-frequency carrier, and determines the frequency difference to be larger than the predetermined threshold Δ, by comparing the expected inter-frequency carrier (such as EARFCN; i.e., the E-UTRA Absolute Radio Frequency Channel Number, where E-UTRA denotes Evolved Universal Terrestrial Radio Access) based on the cluster head device carrier frequency (i.e., where the EARFCN of the cluster head device 12b is used), and the correct carrier frequency of the network node 14 detected by the wireless device 12b.

There may be different ways to acquire the predetermined threshold Δ. Different embodiments relating thereto will now be described in turn. For example, the predetermined threshold Δ may be hard coded from a standard of the communication protocol used. That is, according to an embodiment the predetermined threshold is determined according to a communications standard or protocol. For example, the predetermined threshold Δ may be sent in a configuration message form the cluster head device 12b the wireless device 13b is operatively connected to. That is, according to an embodiment the processing unit 21 of the wireless device 13b is arranged to, in an optional step S102b, receive the predetermined threshold Δ from the cluster head device 13b. The receiving may be performed by executing functionality of the receiving unit 21d. The computer program 42a and/or computer program product 41a may thus provide means for this receiving.

Second Overall Embodiment; Cluster Head Device

Reference is now made to FIG. 1 and FIG. 7. A method for carrier frequency handling in a cluster based communications network 11 as performed by a cluster head device 12b associated with a cluster head carrier frequency $f_{CH}$ will now be disclosed.

The processing unit 31 of the cluster head device 12b is arranged to, in a step S202, acquire a difference between the cluster head carrier frequency and a network node carrier frequency $f_{NN}$ associated with a network node 14. The acquiring may be performed by executing functionality of the acquiring unit 31a. The computer program 42b and/or computer program product 41b may thus provide means for this acquiring. As will be further disclosed below there may be different ways to acquire the difference.

Based on the determined difference the cluster head device 12b then determines how to handle the fact that the cluster head carrier frequency deviates from the network node carrier frequency. The processing unit 31 of the cluster head device 12b is therefore arranged to, in a step S204, determine, for a wireless device 13b camping on or served by the cluster head device, a frequency adjustment action out of at least two possible frequency adjustment actions based on the magnitude of the frequency difference. The determining may be performed by executing functionality of the determining unit 31b. The computer program 42b and/or computer program product 41b may thus provide means for this determining.

Reference is now made to FIG. 1 and FIG. 8. Embodiments relating to further details of carrier frequency handling as performed by a cluster head device 12b associated with a cluster head carrier frequency $f_{CH}$ will now be disclosed.

There may be different ways to acquire the difference between the cluster head carrier frequency and the network node carrier frequency $f_{NN}$ associated with the network node 14. Different embodiments relating thereto will now be described in turn.

For example, the cluster head device 12b may on a regular basis (such as every 50-1000 ms) perform a scan for potential other cluster head devices 12a or network nodes 14 that may be in the vicinity of the cluster head device 12b. The scanning may be similar to ordinary cell search. The processing unit 31 of the cluster head device 12b may then determine, based on the outcome of the cell search whether a network node 14 (or another cluster head device 12a) is detected. According to an embodiment the processing unit 31 of the cluster head device 12b is thus arranged to, in an optional step S202a, perform a cell search and from the cell search detecting the network node so as to acquire the difference. The cell search may be performed by executing functionality of the performing unit 31c. The computer program 42b and/or computer program product 41b may thus provide means for this performing.

For example, the cluster head device 12b may receive a frequency error (frequency shift) event from a wireless device 13b operatively connected to the cluster head device 12b. According to an embodiment the processing unit 31 of the cluster head device 12b is thus arranged to, in an optional step S202b, receive an event report from the wireless device camping on or served by the cluster head device so as to acquire the difference. The receiving may be performed by executing functionality of the receiving unit 31d. The computer program 42b and/or computer program product 41b may thus provide means for this receiving. In such cases, the processing unit 31 of the cluster head device 12b may determine the frequency shift needed in order to align its carrier frequency with the network node carrier frequency as reported by the wireless device 13b.

There may be different kinds of frequency adjustment actions to be performed. The frequency adjustment actions may be performed by executing functionality of the adjusting unit 31e. The computer program 42b and/or computer program product 41b may thus provide means for this adjusting. Different embodiments relating thereto will now be described in turn.

One frequency adjustment action involves a step change which may be performed at a specific time instant. According to an embodiment the processing unit 31 of the cluster head device 12b is arranged to perform a first frequency adjustment action by, in an optional step S204c, determine a step change of the cluster head carrier frequency and a time instant for performing said change, wherein the step change is based on said difference.

The frequency shift may also include a timing shift, i.e. the reference timing may be needed to be changed in order to be aligned with the network node timing. Therefore, the step change may be performed at a time instant occurring after operations such as, but not limited to, emptying potential data blocks in HARQ (Hybrid automatic repeat request) memories, etc.

One frequency adjustment action involves a gradual frequency adjustment. The rate of the gradual frequency adjustment may be slow, for example in the order of 100-300 Hz/second, such that the internal Automatic Frequency Controller (AFC) of the wireless device 13b is able to follow the change. Thus, according to an embodiment the processing unit 31 of the cluster head device 12b is arranged to perform a second frequency adjustment action by, in an optional step S204d, gradually adjust the cluster head carrier frequency towards the network node carrier frequency. The cluster head device 12b may also explicitly inform the wireless device 13b about the gradual frequency adjustment.

There may be different ways to determine which frequency adjustment action to perform. Different embodiments relating thereto will now be described in turn.

For example, if the frequency difference is large (for example, in the order of 2 kHz or more), the cluster head device 12b may determine to perform the first frequency adjustment action (as in step S104c) in order to in a step align with the network carrier frequency. According to an embodiment the processing unit 31 of the cluster head device 12b is therefore arranged to, in an optional step S204a, perform the first frequency adjustment action in a case said difference is larger than a second predetermined threshold.

For example, if the frequency difference is small (for example, in the order of 2 kHz or less), the cluster head device 12b may determine to perform the second frequency adjustment action (as in step S104d) in order to gradually shift the carrier frequency towards the network node carrier frequency. According to an embodiment the processing unit 31 of the cluster head device 12b is therefore arranged to, in an optional step S204b, perform the second frequency adjustment action in a case the difference is smaller than the second predetermined threshold.

The cluster head device 12b may inform the wireless device 13b about the frequency change and potential timing change. According to an embodiment the processing unit 31 of the cluster head device 12b is thus arranged to, in an optional step S206, report the determined frequency adjustment action to the wireless device camping on or served by the cluster head device. The reporting may be performed by executing functionality of the reporting unit 31f. The computer program 42b and/or computer program product 41b may thus provide means for this reporting.

There may be different ways for the cluster head device 12b to inform the wireless device 13b about the determined frequency adjustment action. Different embodiments relating thereto will now be described in turn.

The cluster head device 12b may inform the wireless device 13b about the determined frequency adjustment action via dedicated signaling. Thus, according to an embodiment the processing unit 31 of the cluster head device 12b is arranged to, in an optional step S206a, report the determined frequency adjustment action by transmitting dedicated signalling.

The cluster head device 12b may inform the wireless device about the determined frequency adjustment action via broadcast messages. Thus, according to an embodiment the processing unit 31 of the cluster head device 12b is arranged to, in an optional step S206b, report the determined frequency adjustment action by transmitting a broadcast signal.

In summary there has been presented embodiments relating to carrier frequency handling in a cluster based communications network 11.

In a first overall embodiment, a wireless device operatively connected to a cluster head device has been disclosed. A wireless device 13b in a cluster outside network coverage scans for network nodes and detects a network node 14. The wireless device 13 determines a frequency difference between the cluster head device 12b and the network node 14. If the difference is larger than a predetermined threshold it reports a frequency event to the cluster head device 12b. In one embodiment the predetermined threshold is determined from a communication standard, and in another embodiment it is based on configuration information received from the cluster head device 12b.

In a second overall embodiment a cluster head device 12b determines a need for adjusting a carrier frequency used for communications with a wireless device 13b in the cluster served by the cluster head device 12b. The adjustment is needed in order for the carrier frequency to be aligned with a network node 14 with a better clock accuracy than the clock accuracy of the cluster head device 12b. In some embodiments, the cluster head device 12b itself determines the need, and in other embodiments the cluster head device 12b receives an event form a wireless device 13b in the cluster. In further embodiments the adjustment is accomplished by a frequency shift and wireless devices 13b in the cluster are informed, via broadcast message or dedicated signaling. In other embodiments the cluster head device 12b gradually adjusts the carrier frequency towards the network node carrier frequency. Also in this embodiment the wireless devices 13b in the cluster may be informed.

However, as is readily appreciated by a person skilled in the art, other embodiments than the ones disclosed above are equally possible within the scope of the inventive concept, as defined by the appended patent claims.

For example, the wireless device may be scanning not only for network nodes 14, but also for other cluster head devices outside network coverage.

The skilled person further understands that, although the disclosed subject matter is described in a LTE context and the clusters have been described in a NSPS scenario, the enclosed embodiments are neither limited to LTE, nor to cluster head devices being the type of wireless devices as described above. The enclosed embodiments cover any kind of low power network node controlling other nodes or devices, with some inaccurate clock reference compared to another (network) node having better clock (and carrier frequency) accuracy.

The invention claimed is:

1. A method for carrier frequency handling in a cluster based communications network, the method being performed by a first wireless device camping on or served by a second wireless device acting as a cluster head device associated with a cluster head carrier frequency, the method comprising:
   detecting a network node, the network node being associated with a network node carrier frequency;
   in a case the cluster head carrier frequency differs more than a predetermined threshold from the network node carrier frequency:
      reporting an event relating thereto to the second wireless device acting as a cluster head device; and
   in a case said difference is smaller than said predetermined threshold:
      reporting identity information of the network node to the second wireless device acting as a cluster head device.

2. The method according to claim 1, further comprising: performing cell search so as to detect the network node.

3. The method according to claim 1, further comprising: receiving the predetermined threshold from the cluster head device.

4. The method according to claim 1, wherein the predetermined threshold is determined according to a communications standard or protocol.

5. The method according to claim 1, wherein the event comprises information of the difference between the cluster head carrier frequency and the network node carrier frequency.

6. A first wireless device for carrier frequency handling in a cluster based communications network, the first wireless device being arranged for camping on a second wireless device acting as a cluster head device associated with a cluster head carrier frequency, the first wireless device comprising a processing unit arranged to:
   detect a network node, the network node being associated with a network node carrier frequency;
   in a case the cluster head carrier frequency differs more than a predetermined threshold from the network node carrier frequency:
      report an event relating thereto to the second wireless device acting as a cluster head device; and
   in a case said difference is smaller than said predetermined threshold:
      report identity information of the network node to the second wireless device acting as a cluster head device.

7. A nontransitory computer readable storage medium comprising a computer program for carrier frequency handling in a cluster based communications network, the computer program comprising computer program code which, when run on a first wireless device camping on or served by a second wireless device acting as a cluster head device associated with a cluster head carrier frequency, causes the first wireless device to:
   detect a network node, the network node being associated with a network node carrier frequency;
   in a case the cluster head carrier frequency differs more than a predetermined threshold from the network node carrier frequency:
      report an event relating thereto to the second wireless device acting as a cluster head device; and
   in a case said difference is smaller than said predetermined threshold:
      reporting identity information of the network node to the second wireless device acting as a cluster head device.

* * * * *

UNITED STATES PATENT AND TRADEMARK OFFICE
CERTIFICATE OF CORRECTION

| | |
|---|---|
| PATENT NO. | : 10,070,376 B2 |
| APPLICATION NO. | : 14/917055 |
| DATED | : September 4, 2018 |
| INVENTOR(S) | : Lindoff et al. |

It is certified that error appears in the above-identified patent and that said Letters Patent is hereby corrected as shown below:

On the Title Page

Item (72), under "Inventors", in Column 1, Line 1, delete "Bjarred" and insert -- Bjärred --, therefor.

Item (72), under "Inventors", in Column 1, Line 2, delete "Hollviken" and insert -- Höllviken --, therefor.

In the Specification

In Column 3, Line 41, delete "information form" and insert -- information from --, therefor.

In Column 5, Line 22, delete "Multiplex)," and insert -- Multiple Access), --, therefor.

In Column 6, Line 29, delete "relative the" and insert -- relative to the --, therefor.

In Column 7, Line 17, delete "FIG. 3" and insert -- FIG. 2b --, therefor.

In Column 7, Line 51, delete "wireless device 12a, 12b," and insert -- wireless device 13a, 13b, --, therefor.

In Column 7, Line 52, delete "cluster head device 13b." and insert -- cluster head device 12b. --, therefor.

In Column 7, Line 53, delete "cluster head device 13a, 13b," and insert -- cluster head device 12a, 12b, --, therefor.

In Column 9, Line 59, delete "reporting" and insert -- reporting. --, therefor.

In Column 10, Line 20, delete "wireless device 12b." and insert -- wireless device 13b. --, therefor.

Signed and Sealed this
Fourth Day of December, 2018

Andrei Iancu
*Director of the United States Patent and Trademark Office*

CERTIFICATE OF CORRECTION (continued)
U.S. Pat. No. 10,070,376 B2

In Column 10, Line 29, delete "form the" and insert -- from the --, therefor.

In Column 10, Lines 33-34, delete "cluster head device 13b." and insert -- cluster head device 12b. --, therefor.

In Column 13, Line 16, delete "form a" and insert -- from a --, therefor.